United States Patent Office

2,980,682
Patented Apr. 18, 1961

2,980,682

LIQUID PHASE DEHYDRATION OF ISOPROPANOLAMINE

George W. Fowler, South Charleston, W. Va., assignor to Union Carbide Corporation, a corporation of New York No Drawing. Filed Jan. 9, 1958, Ser. No. 707,847

5 Claims. (Cl. 260—268)

This invention relates to the manufacture of 2,5-dimethylpiperazine and more particularly to a novel method of making 2,5-dimethylpiperazine to obtain a relatively high yield of the trans-form of this compound. This application is a continuation-in-part of my prior copending application Serial No. 624,194, filed November 26, 1956.

The dimethylpiperazines are useful monomers in the synthesis of a variety of polymeric products. These compounds are in effect difunctional secondary amines and are reactive with dicarboxylic acids to form polyamide resins and with diisocyanates to form polyurea resins. Also dimethylpiperazines may be used as starting materials in the preparation of various pharmaceutical products. The preferred starting material for most of these syntheses is the tranisomer, that is trans-2,5-dimethylpiperazine.

Various methods of preparing 2,5-dimethylpiperazine are known in the art, but in general such methods produce both the desired trans- and the undesired cis-form of this compound and the yield of the trans-form is relatively low. It is accordingly an object of the present invention to provide an improved method of making trans-2,5-dimethylpiperazine. It is another object of the invention to provide a method of making 2,5-dimethylpiperazines from inexpensive, readily available reagents to give a relatively high yield of the trans-isomer. Other objects of the invention will be in part obvious and in part pointed out hereafter.

In accordance with the present invention, 2,5-dimethylpiperazine is prepared by heating isopropanolamine at an elevated temperature and pressure in the presence of a hydrogenation catalyst to form a mixture of cis- and trans-2,5-dimethylpiperazine, and the trans-isomer is then separated from the reaction products. In a preferred embodiment of the invention a pressure vessel is charged with isopropanolamine and a hydrogenation-dehydrogenation catalyst selected from the group consisting of nickel and cobalt catalysts. Raney nickel and Raney cobalt may advantageously be used. The isopropanolamine and catalyst are heated within the pressure vessel under an atmosphere of hydrogen at super-atmospheric pressure until a major fraction of the isopropanolamine is converted to 2,5-dimethylpiperazine.

If desired, the reaction mixture may include a nonreactive solvent, and the solvent may be of a type that forms an azeotrope with isopropanolamine and thus facilitates the separation of unreacted isopropanolamine from the reaction mixture by distillation after the initial reaction has been completed. Such azeotroping agents may be aliphatic hydrocarbons such as VMP naphtha and nonane, as well as lower alkylbenzenes such as ethylbenzene, diethylbenzene, isopropylbenzene, and toluene. The solvent does not enter into the reaction, and the isopropanolamine and catalyst being the active components of such a reaction mixture. It should be noted that the use of such a solvent is not indispensible in carrying out the present process.

The reaction mixture is desirably heated to a temperature within the range of 140° to 200° C., although some latitude in temperatures both above and below this range can be permitted. The pressure employed is such as to maintain the isopropanolamine and 2,5-dimethylpiperazine in the liquid phase. In order to achieve a satisfactory yield, it has been found desirable to use a pressure of at least about 200 p.s.i. There appears to be no advantage is using pressures above about 1500 p.s.i. and hence this pressure may be considered a convenient maximum. Satisfactory results are obtained by using maximum pressures of the order of 1000 p.s.i. or somewhat higher.

It has been found that, by carrying out the reaction as thus described, yields of 2,5-dimethylpiperazine of 50% or better based on the quantity of isopropanolamine used can be achieved. Upon completion of the pressure reaction, the reaction product, containing a mixture of the cis- and trans-isomers of 2,5-dimethylpiperazine and unreacted isopropanolamine, is refined in any suitable manner to recover the trans-isomer therefrom. Since trans-2,5-dimethylpiperazine is a solid at atmospheric temperatures, whereas the cis-isomer is a liquid, the trans-isomer can be conveniently separated from mixtures of cis- and trans-isomers by crystallization.

In accordance with one procedure that has been found useful, the reaction mixture from the pressure vessel is diluted with water to increase its fluidity, then filtered to remove the catalyst. A hydrocarbon azeotroping agent such as benzene or toluene is added to the filtrate and the mixture heated to remove water as a hydrocarbon-water azeotrope. The dehydrated mixture is cooled, whereupon the trans-isomer crystallizes and is separated by filtration. If desired to yield of trans-isomer can be increased by isomerization of the cis-isomer as disclosed and claimed in my copending application Serial No. 624,194 and as described in Example 1 of the present application.

Alternatively, the reaction mixture from the pressure vessel can be distilled and a fraction recovered comprising a mixture of the cis- and trans-isomers. Upon cooling, the trans-isomer crystallizes out and is separated by filtration. The cis-isomer in the filtrate can be isomerized as referred to above to produce further quantities of the trans-isomer.

It has been found that unreacted isopropanolamine present in the reaction mixture tends to solubilize the trans-isomer, and accordingly it is advantageous to remove this unreacted isopropanolamine before the trans-isomer is separated. To effect a separation of the isopropanolamine, an agent that forms an azeotrope therewith is desirably added to the mixture. As indicated above alkylbenzenes, such as ethylbenzene, are suitable azeotroping agents for this purpose. The azeotropic separation of isopropanolamine from 2,5-dimethylpiperazines is more fully described in my copending application Serial No. 624,193, filed November 26, 1956.

It has been previously pointed out that the preferred hydrogenation-dehydrogenation catalysts for the present reaction are nickel and cobalt catalysts. However, other hydrogenation-dehydrogenation catalysts can be used. For example, as indicated in the examples given below an iron-chromium-copper catalyst can be used.

In order to point out more fully the nature of the present invention the following specific examples are given of illustrative embodiments of the invention:

*Example 1*

There was charged to a rocking autoclave 1026 grams of monoisopropanolamine and 50 grams of wet Raney nickel. (Because of its pyrophoric character, Raney nickel is usually weighed wet with water; it commonly contains 60% to 80% metallic nickel.) Hydrogen was passed into the autoclave until a pressure of 400 p.s.i. gauge was obtained, after which the autoclave was heated to a temperature of 172° C. When this temperature was reached the pressure was 700 p.s.i. gauge. More hydrogen was added to increase this pressure to 1100 p.s.i. gauge, and the temperature was maintained between 172° and 182° C. for a period of 6.25 hours. At the end of this period the pressure had decreased to 900 p.s.i. gauge.

In a second and similar run 1220 grams of monoisopropanolamine were added to a rocking autoclave together with 50 grams of wet Raney nickel. The temperature was maintained between 175° C. and 182° C. for a period of 6 hours. The pressure at the end of this period was 1200 p.s.i. gauge.

The products from each of the above runs were separately diluted with water, filtered to remove the catalyst and distilled azeotropically with toluene to separate water therefrom. The azeotropic distillate thus obtained separated into top and bottom layers and the top layers were continuously recycled to the top of the distillation column for further distillation. After the azeotropic distillation was complete the residues remaining were cooled and solid trans-2,5-dimethylpiperazine crystallized from the liquid reaction products. The trans-compound was separated from each reaction product by filtration. The filtrates from the two runs containing cis-2,5-dimethylpiperazine were combined and the toluene was distilled from them with temperatures at the top of the distillation column up to 135° C.

After removal of the toluene, 949 grams of the filtrate remaining as residue was charged to a rocker autoclave together with 50 grams of wet Raney nickel. Hydrogen was introduced into the autoclave under pressure and the autoclave was maintained at a temperature of 198° to 203° C. for a period of 6.33 hours. The pressure in the autoclave at the end of this time was 1090 p.s.i. gauge. The product from the autoclave was diluted with water, filtered to remove catalyst and dehydrated by azeotropic distillation using toluene. The azeotropic distillate thus obtained separated into top and bottom layers and the top layer was continuously recycled to the distillation column for further distillation. After the azeotropic distillation was complete, the residue remaining was cooled and 300 grams of solid trans-2,5-dimethylpiperazine crystallized and was removed by filtration from the reaction products. It is thus apparent that a substantial amount of the cis-isomer in the starting material had been converted to the solid trans-isomer.

After separation of the trans-isomer, the filtrate can be distilled at a column head temperature up to 135° C. to remove toluene and the residue further treated as indicated above to isomerize additional quantities of the cis-isomer to the trans-isomer.

*Example 2*

A rocking pressure autoclave was charged with 1000 grams of monoisopropanolamine and 50 grams of wet Raney nickel. Hydrogen was introduced into the autoclave to a pressure of 500 p.s.i. and the autoclave was heated to 166° C., at which temperature further hydrogen was added to increase the pressure to 1100 p.s.i. The reaction temperature was maintained between 166° and 172° C. for about 5.5 hours and the final pressure was 950 p.s.i.

The reaction mixture was removed from the autoclave, diluted with water and filtered to separate the catalyst, after which it was distilled with a hydrocarbon azeotroping agent to remove water therefrom. Upon cooling the residue, solid trans-2,5-dimethylpiperazine crystallized therefrom. The crystals amounting to 257 grams were separated by filtration, and the filtrate was analyzed for dimethylpiperazine. It was found that the filtrate contained 44% by weight of dimethylpiperazine, presumably in the cis-form. The total yield of dimethylpiperazine based on the monoisopropanolamine charged was 55%.

*Example 3*

An autoclave was charged with 990 grams of monoisopropanolamine and approximately 50 grams of wet Raney cobalt. Hydrogen was introduced to a pressure of 400 p.s.i. and the reaction mixture was heated to 178° C. Further hydrogen was then introduced to build the pressure up to 1100 p.s.i. The reaction temperature was maintained at 178° C. to 181° C. for 5.5 hours, at the end of which time the pressure was 1040 p.s.i.

The reaction products were refined in the manner described in Example 2, and the total yield of dimethylpiperazine based on the amount of monoisopropanolamine used as a starting material was 53%.

*Example 4*

An autoclave was charged with 750 grams of monoisopropanolamine and 40 grams of an iron-copper-chromium hydrogenation catalyst prepared in accordance with the procedure of Example 1 of U.S. Patent No. 2,575,404. Hydrogen was introduced into the autoclave to bring the pressure to 500 p.s.i. and the reaction mixture was heated to 177° C. at which temperature the pressure had increased to 1040 p.s.i. The reaction mixture was heated for five hours at 177° and 180° C. The pressure increased to 1250 p.s.i. during the reaction period.

The reaction products were treated as in Example 2 and it was found that the total yield of 2,5-dimethylpiperazine was 45% based on the amount of monoisopropanolamine charged to the autoclave.

*Example 5*

A one-gallon stirred autoclave was charged with 2000 grams of monoisopropanolamine and 100 grams of wet Raney nickel. Hydrogen was admitted to raise the pressure to approximately 175 p.s.i. On heating to 178° to 182° C. for 6 hours the pressure kept building up and gas was vented several times during the run to bring the gauge pressure back to approximately 225 p.s.i.

The reaction product was treated in a manner generally similar to that of Example 2 and the yield of 2,5-dimethylpiperazine was found to be about 60%.

*Example 6*

A rocking pressure autoclave was charged with 1000 grams of monoisopropanolamine and 50 grams of wet Raney nickel. Hydrogen was introduced into the autoclave to raise the pressure to 500 p.s.i. The reaction mixture was then heated to 182° C. at which temperature the pressure was 900 p.s.i. Additional hydrogen was introduced to raise the pressure to 1200 p.s.i. Heating of the reaction mixture at 178° to 182° C. was continued for about 6 hours, at the end of which period the pressure was 1150 p.s.i.

The reaction mixture was filtered to remove catalyst and treated in a manner generally similar to that of Example 2. The indicated apparent yield of 2,5-dimethylpiperazine was about 81% of theory based on the monoisopropanolamine charged to the autoclave.

From the foregoing description it should be apparent that the present invention provides a process of making 2,5-dimethylpiperazine capable of achieving the objectives set forth at the beginning of the present specification. In cases where nickel and cobalt catalysts are used total yields of the two isomeric forms of 2,5-dimethylpiperazine are in excess of 50% based on the weight of isopropanolamine used as a starting material. Substantial amounts of trans-isomer are produced and can be readily separated from the reaction mixture. As indicated in the introductory portion of the specification, the cis-isomer can be isomerized to produce further quantities of the trans-isomer if desired. The yield of 2,5-dimethylpiperazine using the iron-chromium-copper catalyst of Example 4 is somewhat lower than that obtained with the nickel and cobalt catalysts, but is still substantial.

It is of course to be understood that the foregoing examples are illustrative only and that numerous changes can be made in the material, proportions and conditions set forth without departing from the spirit of the invention as set forth in the appended claims.

I claim:

1. The method of making 2,5-dimethylpiperazine which comprises heating a mixture of isopropanolamine and a hydrogenation-dehydrogenation catalyst selected from the group consisting of Raney nickel and Raney cobalt in the presence of hydrogen under super-atmospheric pressure and at a temperature of at least 140° C. to convert a major fraction of said isopropanolamine to 2,5-dimethylpiperazine.

2. The method of making 2,5-dimethylpiperazine which comprises heating a mixture of isopropanolamine and a Raney nickel catalyst in the presence of hydrogen to a temperature of 140° to 200° C. under a pressure of 200 to 1500 p.s.i. to convert a major fraction of said isopropanolamine to 2,5-dimethylpiperazine.

3. The method of making 2,5-dimethylpiperazine which comprises heating a mixture of isopropanolamine and a Raney cobalt catalyst in the presence of hydrogen to a temperature of 140° to 200° C. under a pressure of 200 to 1500 p.s.i. to convert a major fraction of said isopropanolamine to 2,5-dimethylpiperazine.

4. A process for the manufacture of trans-2,5-dimethylpiperazine which comprises heating isopropanolamine under elevated hydrogen pressure not substantially above about 1000 p.s.i. in the presence of a nickel hydrogenation-dehydrogenation catalyst at an elevated temperature in excess of about 140° C. to convert a major fraction of said isopropanolamine to a mixture of cis- and trans-2,5-dimethylpiperazine, and separating the trans-2,5-dimethylpiperazine from the reaction product.

5. A process which comprises heating a mixture of chemically condensable starting material consisting essentially wholly of isopropanolamine, and a nickel-containing hydrogenation catalyst in contact with hydrogen in a closed vessel under superatmospheric pressure sufficient to yield a liquid phase at an elevated temperature in excess of 140° C.

No references cited.